(12) United States Patent
David et al.

(10) Patent No.: US 7,624,157 B2
(45) Date of Patent: Nov. 24, 2009

(54) ETHERNET CONTROLLER WITH EXCESS ON-BOARD FLASH FOR MICROCONTROLLER INTERFACE

(75) Inventors: Thomas Saroshan David, Austin, TX (US); Paul Kent Highley, Austin, TX (US); Randall Kent Sears, Cedar Park, TX (US)

(73) Assignee: Silicon Laboratories Inc., Austin, TX (US)

( * ) Notice: Subject to any disclaimer, the term of this patent is extended or adjusted under 35 U.S.C. 154(b) by 1257 days.

(21) Appl. No.: 10/880,921

(22) Filed: Jun. 30, 2004

(65) Prior Publication Data

US 2006/0002210 A1 Jan. 5, 2006

(51) Int. Cl.
*G06F 15/167* (2006.01)
*G06F 21/00* (2006.01)
(52) U.S. Cl. ........................ 709/215; 711/153
(58) Field of Classification Search ........................ None
See application file for complete search history.

(56) References Cited

U.S. PATENT DOCUMENTS

| | | | |
|---|---|---|---|
| 6,108,692 A | 8/2000 | Van Seters et al. | |
| 6,591,302 B2 | 7/2003 | Boucher et al. | |
| 6,665,306 B1 * | 12/2003 | Thakur et al. | 370/419 |
| 6,717,952 B2 | 4/2004 | Jones et al. | |
| 6,874,036 B2 * | 3/2005 | Rawson, III | 709/246 |
| 6,879,582 B1 | 4/2005 | Dhara et al. | |
| 7,191,241 B2 | 3/2007 | Boucher et al. | |
| 2006/0294312 A1 | 12/2006 | Walmsley | |

* cited by examiner

*Primary Examiner*—Yemane Mesfin
(74) *Attorney, Agent, or Firm*—Howison & Arnott, L.L.P.

(57) ABSTRACT

A single chip network controller for interfacing between a physical network and a processing system on the media side of the network controller. The network controller includes a physical layer for receiving data for transmission to the network and encoding the received data for transmission thereto and for receiving data from the network, and for receiving data from the network and decoding the received data. A media layer is provided for interfacing with the processing system for receiving data from the processing system for interface with the physical layer for encoding and transmission thereof and for receiving decoded data from the physical layer and providing access thereto by the processing system. An on-chip non-volatile memory is provided having a first portion associated with configuration information for configuring the operation of the physical layer and the media layer, and a second portion thereof that is accessible by the processing system on the media side of the network controller. A memory interface allows the processing system to interface with the second portion of the memory, such that the processing system has an expanded memory capability.

18 Claims, 5 Drawing Sheets

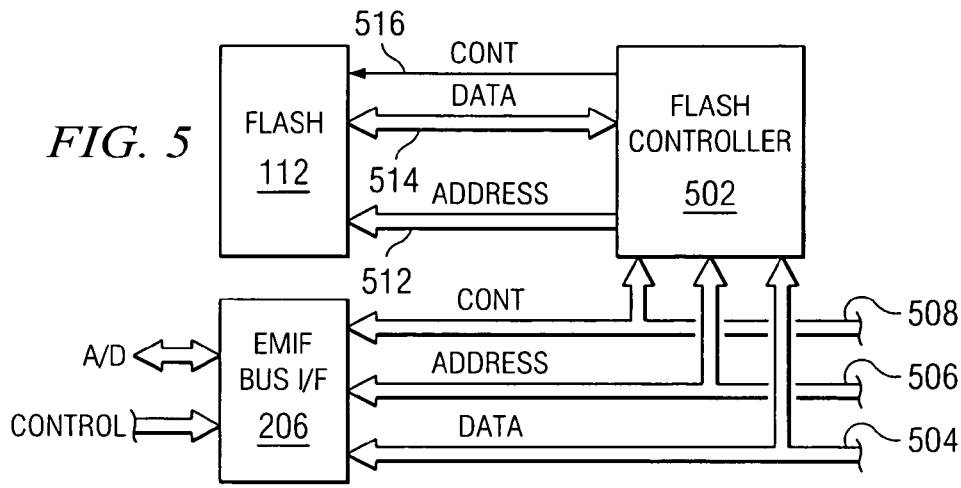
FIG. 5
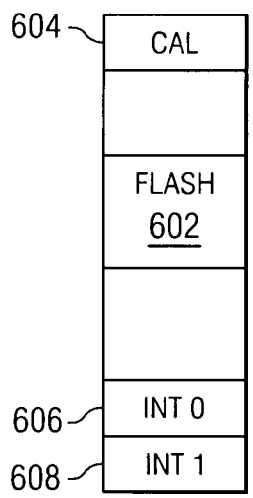
FIG. 6
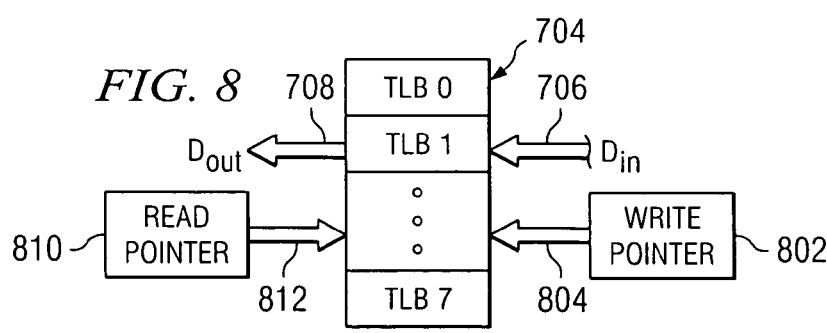
FIG. 7
FIG. 8
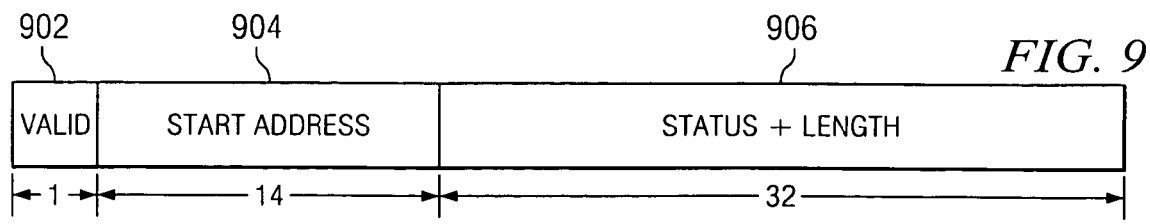
FIG. 9

US 7,624,157 B2

ETHERNET CONTROLLER WITH EXCESS ON-BOARD FLASH FOR MICROCONTROLLER INTERFACE

TECHNICAL FIELD OF THE INVENTION

The present invention pertains in general to Ethernet controllers and, more particularly, to a single chip Ethernet controller having shared on-chip flash memory that is combined with a microcontroller to provide a network appliance.

CROSS REFERENCE TO RELATED APPLICATIONS

This application is related to U.S. patent application Ser. No. 10/881,249 entitled SMART BUFFER CACHING USING LOOK ASIDE BUFFER FOR ETHERNET, filed Jun. 30, 2004.

BACKGROUND OF THE INVENTION

Ethernet controllers have evolved from the original network card type systems that provided network speeds of 2 Mb/s to 10 Mb/s, 100 Mb/s and up to current speeds of 1,000 Mb/s. The 2 Mb/s network interface cards have all but disappeared. Most network interface systems, or Network Interface Cards (NIC), currently provide for all three of higher speeds, 10/100/1000 Mb/s. These are usually referred to as 10 BASE-T, 100 BASE-T, and 1000 BASE-T, the "T" referring to a twisted pair physical media interface, other interfaces providing for connection to optical fibers and the such. Each of the various configurations, at whatever speed, includes on an integrated circuit a media side circuit or Media Access Controller, the MAC, and a physical side circuit of physical layer, the PHY. The NIC is operable to provide timing and encoding/decoding for receiving data and transmitting data. Typically, when data is transmitted over the physical transmission line, such as an RJ45 twisted wire cable, data will be received by the NIC from a processing system and this data stored in a FIFO of some sort, encoded for transmission and then transmitted. For received data, the opposite operation occurs. These are well known circuits and fairly complex. At higher speeds, the core processing circuitry basically requires Digital Signal Processing (DSP) capability. Further, each network card will have associated therewith a unique address, such that it is unique to all other address cards and can be disposed on any network regardless of what other cards are disposed on the network. This is for the purpose of uniquely identifying any network device that is disposed on the network apart from other network cards. To facilitate this, a large block of numbers was originally created for the Ethernet by a centralized standards body, which large number is considered to be an inexhaustible number.

With current advances in the art, there is a desire to have small network appliances that all have unique network addresses such that they can be disposed on a network and provide the functionality of interfacing with the physical side and interfacing with the media side. However, the integrated circuits that are utilized to realize network controllers are becoming more complex, smaller and inexpensive due to volume considerations. At the same time, the network appliances are becoming less sophisticated. Even though they are less sophisticated in functionality, such as the thermostat, the complexity of the network interface card is still required. Thus, the more complex circuitry is actually in the peripheral circuit and less complex circuitry is in the network appliance side.

SUMMARY OF THE INVENTION

The present invention disclosed and claimed herein, in one aspect thereof, comprises a single chip network controller for interfacing between a physical network and a processing system on the media side of the network controller. The network controller includes a physical layer for receiving data for transmission to the network and encoding the received data for transmission thereto, and for receiving data from the network and decoding the received data. A media layer is provided for interfacing with the processing system, for receiving data from the processing system, for interfacing with the physical layer, for encoding and transmission thereof and for receiving decoded data from the physical layer and providing access thereto by the processing system. An on-chip non-volatile memory is provided having a first portion associated with configuration information for configuring the operation of the physical layer and the media layer, and a second portion thereof that is accessible by the processing system on the media side of the network controller. A memory interface allows the processing system to interface with the second portion of the memory, such that the processing system has an expanded memory capability.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a block diagram of the interface of the flash memory with the on-chip data, address and control buses;

FIG. 6 illustrates a diagrammatic view of the memory map of the on-board flash;

FIG. 7 illustrates a block diagram of the translation look-aside buffer (TLB);

FIG. 8 illustrates a diagrammatic view of the TLB and the Read and Write pointers associated therewith;

FIG. 9 illustrates a diagrammatic view of a TLB word;

DETAILED DESCRIPTION OF THE INVENTION

Figure 1:
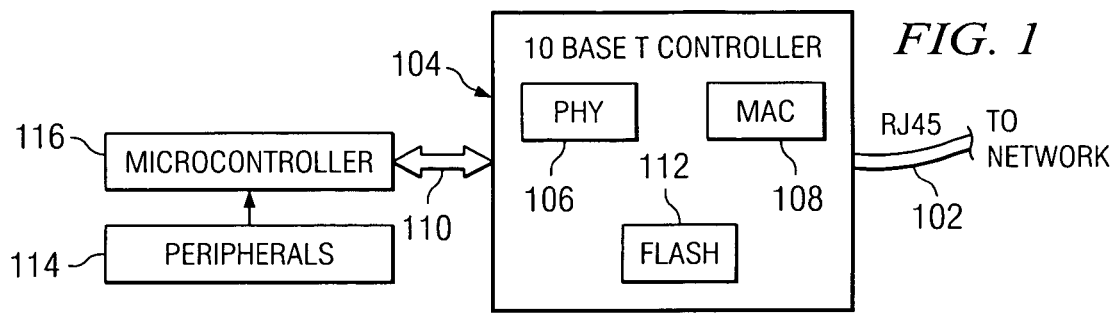
FIG. 1 illustrates a block diagram of a network controller interfaced with a microcontroller that provides some functionality for interfacing with peripherals and a network interface card.

Referring now to FIG. 1, there is illustrated a diagrammatic view of a network appliance that is operable to be disposed on a network. The network appliance is basically interfaced to a network with some type of physical cable 102. In an Ethernet environment, this would be an RJ45 cable. However, there could be other types of networks, even a wireless network. The physical cable is interfaced with a network interface controller 104. This controller has associated therewith a physical layer section 106 that is labeled PHY. This provides for the encoding/decoding functions, the timing functions, etc., that are necessary to interface with the network through the particular physical media. For example, in an RJ45 cable, this is well known but different than for an optical cable, which would require a different set of timing rules, etc. The PHY 106 handles this encoding/decoding and timing. On the opposite side of the controller 104 is provided a media interface device 108, referred to as a Media Access Controller (MAC). Thus, data can be received on an input databus 110 from the media side, processed through the MAC 108 and the PHY 106 for transmission to the physical cable 102. Conversely, data can be received from the physical cable 102, processed by the PHY 106 and MAC 108 and output on the databus 110. The databus 110 is connected to a microcontroller 116, which is a device that provides minimal processing in this application. It has a digital side to interface with the bus 110 and possibly some analog circuitry, such that the microcontroller 116 would constitute a mixed-signal device. The analog circuitry could interface with various analog peripherals 114, to sense environmental parameters, etc., for interface with the network. For example, this network appliance could be a thermostat, wherein temperature were measured and control outputs provided that could be transmitted via the network to another network appliance such as a furnace controller, or the microcontroller 116 could interface with the furnace controller as a local peripheral and the network would merely provide remote monitoring and control of the thermostat. It should be noted that there are many applications that require a microcontroller that interfaces to a network for communication purposes and which network appliance would require a unique network address such that it is identifiable on a network. Further, although not disclosed herein, the network controller 104 could have a network address that was definable on an even larger network such as a global communication network (GCN) that is typically referred to as the Internet.

Most Ethernet controllers will typically require some type of external memory to provide for storage of configuration information that will be loaded automatically at power-up. Typically, an EEPROM will be utilized, since it is both programmable and nonvolatile. The controller 104 has built therein non-volatile flash memory 112 that provides two functions. First, it provides for storage of configuration information on-chip. Second, as will be described in more detail herein below, it provides additional external microcontroller memory to allow minimal functionality microcontrollers with little memory additional accessible storage space. Thus, the microcontroller 116, during the operation thereof, can access the flash memory 112 within the controller 104 for the purpose of storing information thereof such as configuration information and such, and any other information necessary. This basically takes a very unsophisticated microcontroller and provides additional capabilities thereto.

Figure 2:
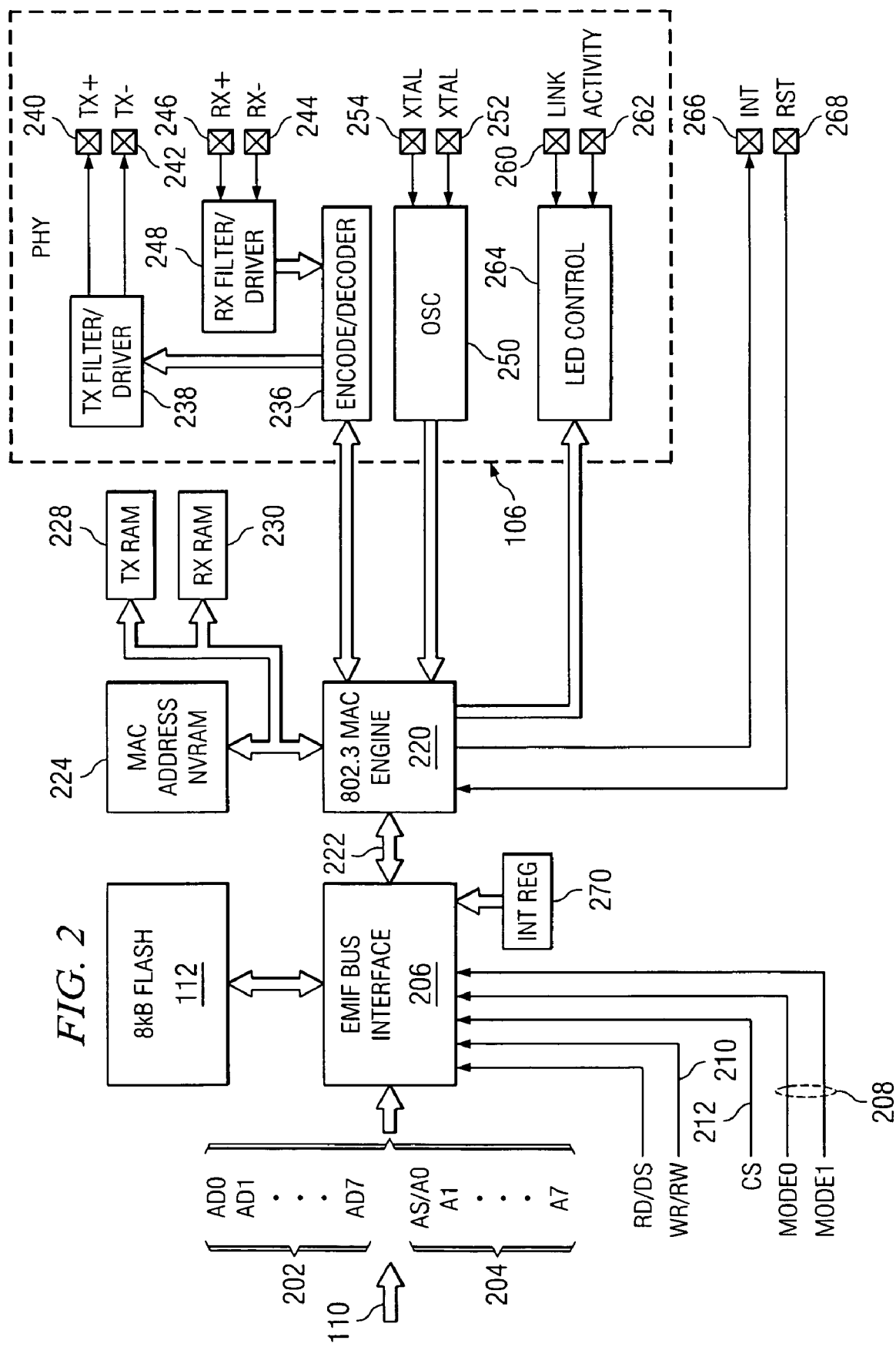
FIG. 2 illustrates a block diagram of the network controller.

Referring now to FIG. 2, there is illustrated a block diagram of the network interface controller 104. This network interface controller 104 is operable at the 10 Mb/s operating rate, such that it is a 10 BASE-T device and can be completely realized on a single chip. In so doing, the entire network interface controller 104 can be fabricated on a single chip with the on-chip flash. There is provided a databus 110 that constitutes the interface between the microcontroller 116 and the network interface controller 102. There is provided in the network interface controller 102 a data interface to the databus 110 that provides for both multiplexed and non- multiplexed operations. For the multiplexed operation, there are provided eight address/data pins 202. For a non-multiplexed operation, there are provided eight additional address pins 204. In the non-multiplexed operation, the pins 202 would be data pins and the pins 204 would be address pins. This configuration for interfacing with a databus utilizes the External Memory Interface (EMIF) format. This is a fairly standard interface that is utilized on different manufacturers' parts, wherein each manufacturer may have a slightly different format. The EMIF interface is provided with a bus interface block 206 that is operable to support one or two different manufacturers' EMIF memory interface formats, these being selected for convenience purposes. Also, this will provide both multiplexed and non-multiplexed formats. These formats are selected by two mode pins 208 that allow for the selection between multiplexed and non- multiplexed operation and also provides for two different interface formats. Only one mode pin is required for selecting between two different third party formats. The bus bandwidth will provide sufficient throughput for the 10 BASE-T throughput with a transaction speed that is less than 300 ns/transaction. Reads and Writes to various memory locations and registers are performed through using various EMIF command-addresses. For example, a Read from the location "RX_AUTO_INCREMENT" will perform a Read from the current receive buffer and will update a receive FIFO pointer. A Read or a Write from a "non-command" location will assume the location is a register that will provide the register Read value, i.e., data, on the EMIF databus at the relevant time. There will be provided Read/Write commands on a pin 210, a chip select command on a pin 212 and other commands that are necessary. In general, any type of interface could be provided that would allow external access to memory on the chip by the microcontroller 116. There is provided the flash memory 112 that is interfaced with the EMIF bus interface block 206. There is also provided a Media Access Control (MAC) engine 220 that is fully compliant with IEEE 802.3 Ethernet Standard (ISO/IEC 8802-3, 1993). This will basically handle all aspects of the Ethernet frame, transmission and reception, including: collision detection, preamble generation detection, and CRC generation and tests. There may even be included various programmable features such as automatic re-transmission or collision and automatic padding of transmitted frames. The MAC engine 220 interfaces with the bus interface 206 through a bus 222. There will be provided a MAC address nonvolatile RAM 224 that interfaces with the MAC engine 220 for the operation thereof. This provides configuration information to the MAC for the operation thereof. Although illustrated as a separate memory location, the MAC address RAM 224 is basically part of the nonvolatile flash 112, albeit in an address location dedicated for storage of configuration information. There are also provided a 2 KB transmit RAM buffer 228 that is interfaced to the MAC engine 220 through a databus and a 4 KB receive RAM 230 that is interfaced to the MAC engine 220 through the databus. Data that is being transmitted will be stored in the transmit RAM 228 and data that is being received will be stored in the receive RAM 230 during the operation thereof.

The MAC engine 220 interfaces with the PHY 106. The PHY 106 includes an encoder/decoder 236 that is operable to receive data from the MAC engine 220 for encoding thereof and receive encoded data therefrom for transmission to the bus 110. Encoded data for transmission is output to a transmit filter/driver block 238 for transmission on two transmit terminals 240 and 242. Data is received on two separate wires at terminals 244 and 246. This configuration is for a physical RJ45 cable, in this disclosed embodiment, such that there are two dedicated transmit pins and two dedicated receive pins. They will be interfaced through a transformer to a transmission line. The received data, once received, is processed through a receive filter/driver block 248 for decoding of the data therein at the block 236. There is provided timing for the MAC engine with an oscillator 250 that typically will require an external crystal on pins 252 and 254.

Most Ethernet controllers will require, as part of the IEEE standard, LEDs that indicate that there is a link and an LED that indicates that there is activity. The link LED is connected to a pin 260 and the activity LED is connected to a pin 262, both pins 260 and 262 controlled by an LED control block 264, which is controlled by the MAC engine 220.

The MAC engine 220 is also operable to generate an interrupt on a pin 266 and receive a reset on pin 268. As such, the MAC engine will be able to generate an interrupt to an external system that can utilize this interrupt to then access an interrupt register 270 for the purpose of determining what interrupt occurred. This interrupt register 270 represents two 8-bit registers.

In general, the receive interface is facilitated with the receive RAM 230, which is basically a 4K FIFO that can support up to eight Read packets. This 4K FIFO can be divided into a maximum of eight packet frames. The FIFO is written via hardware by the receive path of the MAC engine 220, and is read by software via the EMIF interface 206. The transmit interface is facilitated with the transmit RAM 228 that is a 2K single ported RAM buffer. This buffer will be written a byte at a time via the EMIF bus interface block 206 with the packet that is to be transmitted. Once the entire packet has been placed in this RAM 228, a "BEGIN_TX" bit is set which then begins a transmit session to the MAC engine 220. During transmission, a flag is set indicating that the transmit engine is busy. Once the transmission is complete, this bit will be cleared and an interrupt will be generated on the interrupt pin 266 indicating that the transmission has been completed. The transmit engine will support features such as transmitting a pause packet, applying back pressure (half duplex) and overriding the CRC and padding capabilities on a per packet basis. The packet based-transmission on collision, etc. is handled automatically with the MAC engine 220. Basically, transmission is facilitated by first writing the start address of the transmit packet (usually "x0000") to an address register. This is followed by writing data to a TX_AUTO_INCREMENT register location which will place the data in the location pointed to by the address register. Thereafter, transmission is initiated by writing the start address to the address register and then writing a "1" to the "TX_start" bit in the transmit control register.

The flash 112 can be accessed via the EMIF bus interface 206 for Reads and Writes. There are provided some ADDRH/L registers that should first be written with the starting address. Thereafter, an auto-increment Read can be performed or a single-byte Write (or Read) can be performed. Flash mass erases are typically not permitted by the user. These are protected by a lock and key mechanism that will prevent a user from deleting information accidentally. Another lock and key mechanism also protects Writes. Once unlocked, back-to-back Writes to the flash will be possible. To unlock a Write operation, it is necessary to perform back-to-back Write operations to a particular address with some predefined data which is the "key."

There are a number of flash interface registers that are contained in the bus interface. There is a FLASHLOCK register that is operable to perform Writes or page/mass erases with the address values A5, F1, which need to be written to this location consecutively. There is provided an INFOPGWR register that allows the performance of mass erases. To perform mass erases or to write to an information page, a code is required to be written consecutively to this location. There is provided a FLASH ERASE register which can allow for initiating a page erase or a mass erase. A FLASH STATUS register provides status information as to if the flash is having a page erase performed, being mass erased, a flash Write is occurring, the flash is busy or that the flash has been erased since the last reset. There is an ADDRH/L register that is an address register used to access the flash. To Read or Write flash, it is necessary to first write the address of the byte to be accessed in this location and then perform the auto-increment operation for Reads or the 1-byte operation for a Read or a Write, these being EMIF commands. With the auto-increment command, only the address of the first byte needs to be written, with subsequent Reads all incrementing this address.

Figure 3:
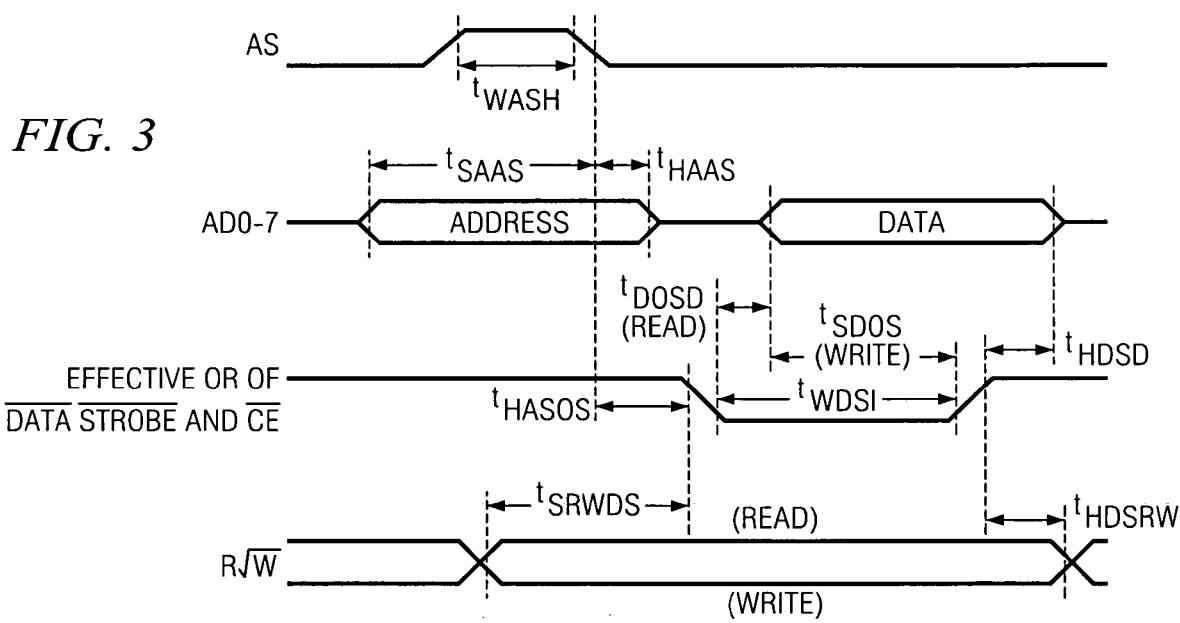
FIGS. 3 and 3a illustrate timing diagrams for the EMIF memory interface for a multiplexed microprocessor bus for both Reads and Writes.
Figure 3A:
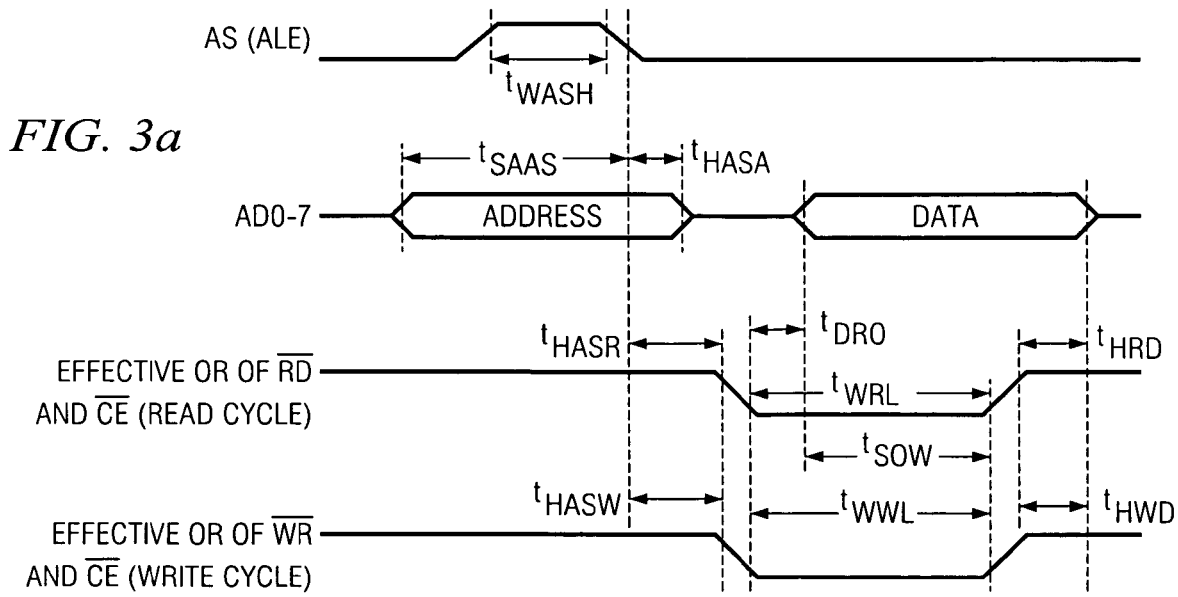

FIGS. 3 and 3A illustrate multiplexed EMIF bus formats. The bus format described with respect to FIG. 3 was that associated with the Motorola® multiplexed bus format. In this format, there is provided an AS signal that, when it goes high, reads the address on AD0-AD7. Thereafter, there will be an effective OR of the DS-Bar and the CE-Bar signals for a Read or a Write operation. The R/W signal indicates a Read or Write operation. When this effective OR during the Read cycle goes low, there will be a Read of the data and when the effective OR for the Write cycle goes low, there will be a Write operation.

The embodiment of FIG. 3A is that associated with the multiplexed microprocessor bus for an Intel® bus format. In this format, there is provided an AS signal that, when it goes high, reads the address on AD0-AD7. Thereafter, there will be an effective OR of the RD-Bar and the CS-Bar signals for a Read cycle. In a Write cycle, there will be an effective OR of the WR-Bar and CS-Bar. When this effective OR for the Read cycle goes low, there will be a Read of the data and when the effective OR for the Write cycle goes low, then there will be a Write operation.

Figure 4:
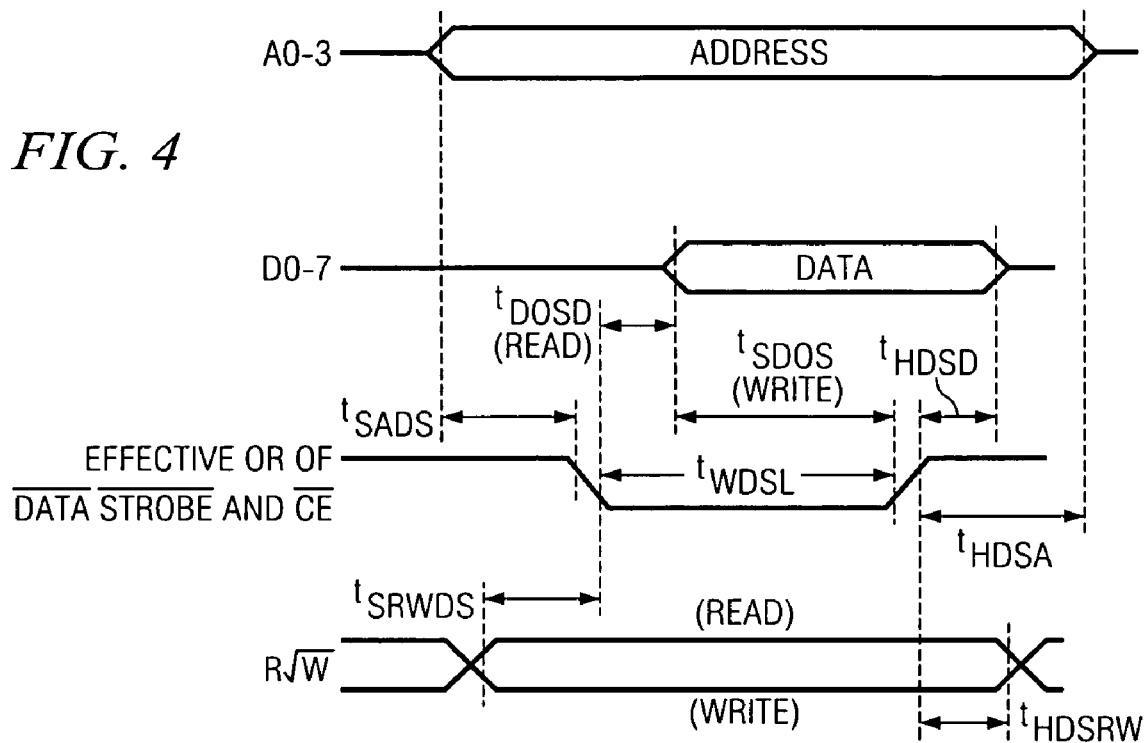
FIGS. 4 and 4a illustrate a timing diagram for an EMIF memory interface for a non-multiplexed microprocessor bus for both Reads and Writes.

The non-multiplexed microprocessor bus for the Motorola® bus format is illustrated in FIG. 4. In this mode, address information is placed on A0-A3 and data is placed on D0-D7 at a later time while the address information is still present. The address is valid first and, a period of time later, data will be valid. For a Read operation, there will be an effective OR of the DS-Bar and CS-Bar after the address is generated. When this effective OR goes low, there will be a Read operation performed if the R/W signal is high and a Write operation if it is low.

Figure 4A:
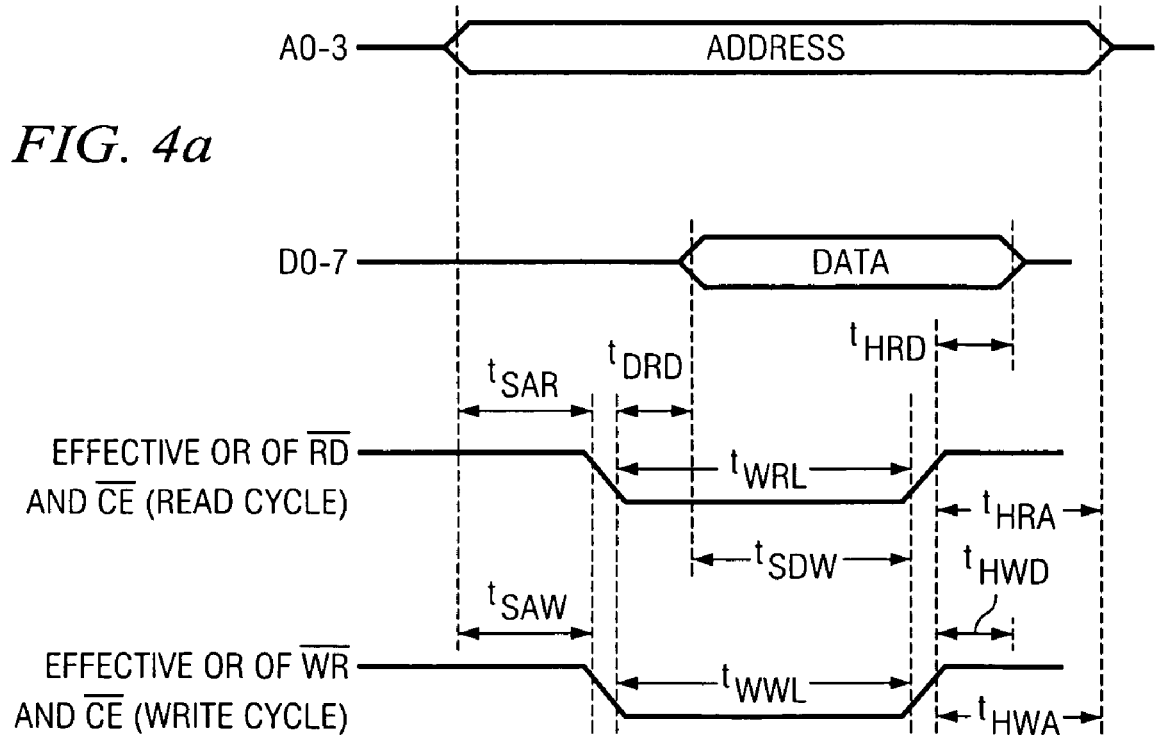

The non-multiplexed microprocessor bus for the Intel® bus format is illustrated in FIG. 4a. In this mode, address information is placed on A0-A7 and data is placed on D0-D7 at a later time. The address is valid first and, a period of time later, data will be valid. For a Read operation, there will be an effective OR of the RD-Bar and CE-Bar. When this effective OR goes low, there will be a Read operation performed. Similarly, the effective OR of WR-Bar and CS-Bar will go low indicating a Write operation.

Referring now to FIG. 5, there is illustrated a diagram of the flash operation with a flash controller 502. The flash 112 is interfaced with the flash controller 502 which is basically operable to control all operations of the flash 112 and has contained therein the registers noted herein above. The EMIF interface 206 is operable to interface with the flash controller 502 through an internal databus 504, address bus 506 and control bus 508. The interface 206 is operable to receive and latch the address in a multiplex mode, onto the address bus 506 and then receive the data and latch that data onto the databus 504. The various control functions to control reading, writing and the such, are provided on the control bus 508. By writing data into particular flash control registers in the flash controller 502, the operation of the flash 112 can be controlled. These utilize a separate address bus 512, databus 514 and control bus 516 between the flash 112 and the flash controller 502. As such, it can be seen that the external device can, through the EMIF memory interface 206 and in addition to communicating with the network, communicate with the flash 112 and actually occupy a portion of the flash memory space, i.e., the flash 112 becomes extended memory for the microcontroller.

Referring now to FIG. 6, there is illustrated a diagrammatic view of the memory map for the entire controller 104. In general, the controller, in addition to the flash 112, as the other various registers, FIFO, RAM, interrupt registers, etc., for storing information therein. Each of the storage locations is addressable in the address space or memory space of the controller 104. The flash 112 is mapped into this space and occupies a portion of the address space 602. There is also provided configuration information, occupying a portion of the memory space 604, which is at the top of the memory. Whenever the part is powered-up, it will automatically go to this portion of the memory space and extract the data therefrom for the purpose of power-up, and running various calibration operations. The flash space 602 will contain some of the configuration information, which will be downloaded therefrom for the purpose of configuration. Also, the interrupt registers are disposed in the memory space at locations 606 and 608.

FIG. 7 illustrates a block diagram of the receive RAM 230 and the operations associated therewith. The receive RAM 230, as noted herein above, is a single port RAM that functions as a FIFO. When receive data is received by the MAC engine 220, it is processed and stored in the RAM 230. Prior art systems, when storing the data, receive the data which, in accordance with the Ethernet® standard, allow for packets to be of a length from 64 bytes to 1516 bytes. Therefore, the boundary between one packet to the next has a variable length. As such, the MAC 220, during processing, is operable to evaluate the packet, do error checking through use of the CRC, and, in the prior art system, generate a header. This header is stored at the first location for the packet, this header defining the length of the packet. The system reading the data out then need only access this header and calculate the length to determine how many bytes are required to be output for a given packet, and this also indicates the start of the next packet. The addresses for a given packet are then sequentially stepped through to the last address therein. In Applicants' disclosed embodiment, there is provided a separate FIFO, a translation look-aside buffer (TLB) 704, that is 47-bits wide by eight rows deep and is operable to store eight headers, the headers having associated therewith the start address in the RAM 230 of a particular byte, and the length and status information associated with that particular packet. The MAC 220 is operable to receive the packet of data and generate the information associated therewith in the form of the start address at which the packet is then stored in the RAM 230, the length and status information associated therewith and also a valid bit associated therewith. This is stored through a databus 706 in the TLB 704. The TLB 704 is a dual port register such that data can be written thereto and read therefrom at substantially the same time if desirable. A Write pointer is generated by the MAC 220, the Write pointer being a hardware driven Write operation. This is provided through a control line 710.

Data is read out from the TLB 704 on a software basis by the microcontroller 116 through the EMIF 206. The TLB 704 interfaces with the EMIF 206 through a bus 708 and control signals provided through a line 712, this being the Read pointer. Therefore, the microcontroller 116 can randomly access information in the TLB 704; however, both the Write pointer and Read pointer are initially set to "0" and they track each other, such that the Read pointer will never get ahead of the Write pointer and will always sequence in the same direction, hence forming a FIFO. The microcontroller 116 controls this Read operation and reads the data out at its own rate. There are also provided receive registers 720 that are operable to store the various parameters associated therewith. The receive registers are defined as follows:

Register Definitions
RXBUFSTAT
    [0]=Indicates reception of a frame in progress.
    [1]=End of read buffer reached.
RXBUFCTL
    [0]=TLB and FIFO pointers (self clearing)
    [1]=skip current buffer (will cause all pointers to update—this bit is self clearing)
    [2]=clear valid bit of current TLB buffer entry—self clearing
    [3]=dbi_active. IDE will need to set this bit every time the user requests a window update. This bit will allow the current receive to finish and disallow all future receipts until this bit is cleared by software.
RXCFN
    [0]=ignore all multicast frames
    [1]=ignore all broadcast frames
HASHL/H
    Multicast hash registers
TLBCURSTAT00/01/02/03
    Contains the 32 bits of status of the current TLB entry pointed to
    01-00[15.0]=contain the length of the current frame
    03-02[31:16]=contains the status bits
        31—shadow of the valid bit
        30—receive VLAN type detected
        29—receive unsupported opcode
        28—receive pause control frame
        27—receive control frame
        26—receive dribble nibble
        25—broadcast packet
        24—multicast packet
        23—receive ok
        22—length out of range
        21—length check error
        20—crc error
        19—receive code violation
        18—carrier event previously seen
        17—RXDV event previously seen
        16—packet previously ignored
RXTLBRDADDRH/L
    Contains the start address of the current buffer in the RX FIFO ram.
TLBSTAT00/01/02/03-70/71/72/73
    contains all status bits for all buffers in randomly accessible fashion
TLBADDR00/01-70/71
    contains all start addresses for all buffers in randomly accessible fashion
TLBVAL
    [7:0]=contains all the valid bits for all the TLB entries. The valid bit for the current buffer can also be found as bit 32 of the CURSTAT register. To clear the valid bit for the current TLB entry set bit 2 of the TLBCTL register. The relevant bit can also be cleared by writing a "0" in a field of "1"'s for the bit that needs to be cleared, in the TLB-VAL register. For example if bit 3 is to be cleared then "xF7" will have to be written to TLBVAL. This register will always be set by hardware and cleared by software so the above procedure is valid.

RXTLBRDPTR

[2:0]=contains the value of the read TLB pointer. (i.e. the address of the TLB entry being read)

RXFIFOHEADH/L

High and low halves of the FIFO head pointer.

RXFIFOTAILH/L

High and low halves of the FIFO tail pointer.

RXFIFOCOUNTH/L

FIFO count register. When this register reaches 4095 an overflow occurs. This register is incremented on writes and decremented on reads. This register will not be used by the general user.

Referring now to FIG. 8, there is illustrated a diagrammatic view of the TLB 704 and the operation thereof. During a data Write operation, the MAC 220 performs a hardware Write. This involves setting a Write pointer 802 to the appropriate address of the one of the eight buffers. This is facilitated through an addressing line 804 (incrementing of the Write Pointer). At the appropriately addressed buffer, there being eight therein, a 47-bit data word is written therein through the bus 706. For a data Read operation, a software generated Read pointer 810 will generate the Read address on an address line 812 to select the appropriate buffer. The Read pointer will be controlled such that it does not exceed the Write pointer. This is a "wrap around" FIFO such that, after writing the buffer TLB 7, the next Write will be to the buffer TLB 0. The Read pointer will always be one buffer behind the Write pointer, although it actually could read the contents that are being written, but there must be some provision provided in that situation wherein the data is fully written prior to being read. Thus, it can be seen that only eight "buffer words" can be stored in the TLB 704 and, therefore, only eight packets accessible in the RX RAM.

Referring now to FIG. 9, there is illustrated a diagrammatic view of each of the TLB buffers and the fields associated therewith. There is provided a 1-bit field 902 that contains a Valid Bit. There are 14 bits stored in a field 904 that define the start address of the associated packet. There is provided a 32-bit address field 906 that provides the status information and the length of the first 16 bits of the receive status word in field 906 contains the length of the received packet. The rest of the bits identify items such as whether a packet was a broadcast or multicast packet and/or if it contains any errors. Bit 31 of field 906 contains a shadow of the Valid Bit contained in field 902, the $47^{th}$ bit. The start address field 904 provides the first ten bits thereof as the start address with the next four bits containing the address of the multicast flag which matched. In operation, before initiating a Read, the software at the microcontroller 116 will have to check the validity of that particular buffer by checking the Valid Bit in field 902. It is expected that the software would unload buffers in order. If for some reason, the user needs to skip over a buffer (i.e., the status bits for the buffer indicated an error occurred during reception) the first bit in field 902 of the TLB control register would be set. This will cause an update of the TLB Read pointer, the FIFO tail pointer, the FIFO count and the Valid Bit of the relevant buffer. Once a buffer has been read out, the Valid Bit should be cleared via software. For example, the procedure for reading a buffer might follow the following steps:

1. Read the status bits and ensure no error occurred and that the Valid Bit is set;
2. Read all data; and
3. Clear Valid Bit of current TLB pointer by setting the bit-2 of receive register RXBUFCTL. Clearing the Valid Bit through this process also increments the TLB address pointer.

Figure 10:
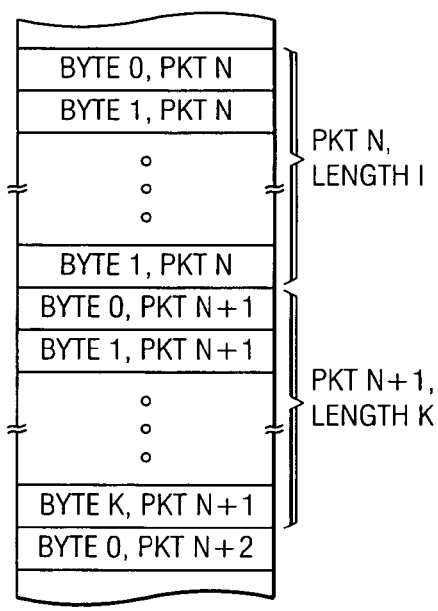
FIG. 10 illustrates a diagrammatic view of the receive RAM FIFO.

Referring now to FIG. 10, there is illustrated a diagrammatic view of the address space associated with the received RAM 230. Illustrated are two packets, a first packet N and a second packet N+1. The first packet has a length of "I" and the second packet has a length of "K." The first packet is written such that the first byte, BYTE 0, is written into the first or starting address space. Sequentially the remaining bytes of the packet will be written until the last byte, BYTE I, is written. Thereafter, the next packet, packet N+1 will be written by storing the first byte, BYTE 0, in the first location, that being the starting address location for PKT N+1. There will be K of the bytes written for that packet N+1. It can be seen that only eight packets can be stored, due to the limitations of the TLB 704. If this occurs, the remaining packets will continually be written in the next sequential location in the memory, this memory 230 being a wraparound memory, since it operates as a single port FIFO. In the event of an overflow, i.e., the Write pointer exceeds the Read pointer by more than eight, then this will cause a packet of data to be lost and no further Write will take place until a packet has been read out from the FIFO and the relevant Valid bit has been cleared.

Figure 11:
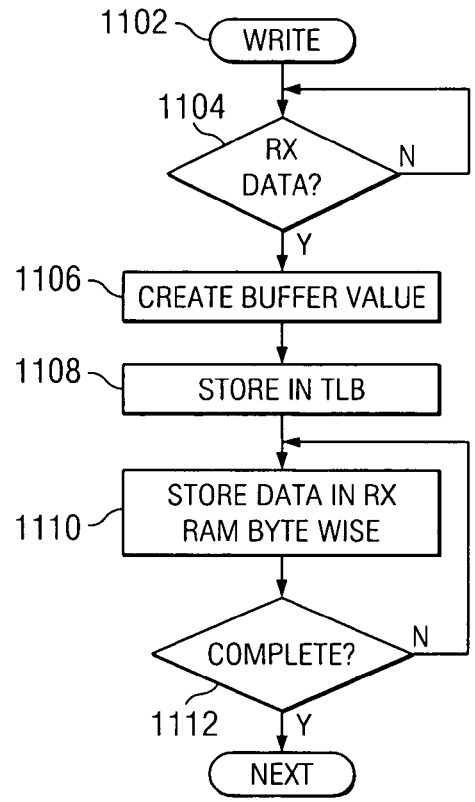
FIG. 11 illustrates a flow chart depicting the Write operation.

Referring now to FIG. 11, there is illustrated a flow chart depicting a Write operation to the receive RAM. This is initiated at a block 1102 and then proceeds to a decision block 1104 to determine if data has been received. If received, it is processed by the MAC 220 and the buffer value created, as indicated by a block 1106. This buffer value is then stored in a TLB, as indicated by block 1108 and then the program proceeds to a block 1110 to store the data in the receive RAM in a byte-by-byte increment. This will continue until the complete packet has been written, which is decided at a decision block 1112, and then the next packet will be written. As described herein above, this is a hardware Write operation and the speed of writing is a function of the speed at which the packets are received. The bytes, therefore, will be received at a certain rate, the MAC engine 220 processing this information, creating the buffer value and storing the information. This is regardless of whether or how fast data is being read from the memory 220.

Figure 12:
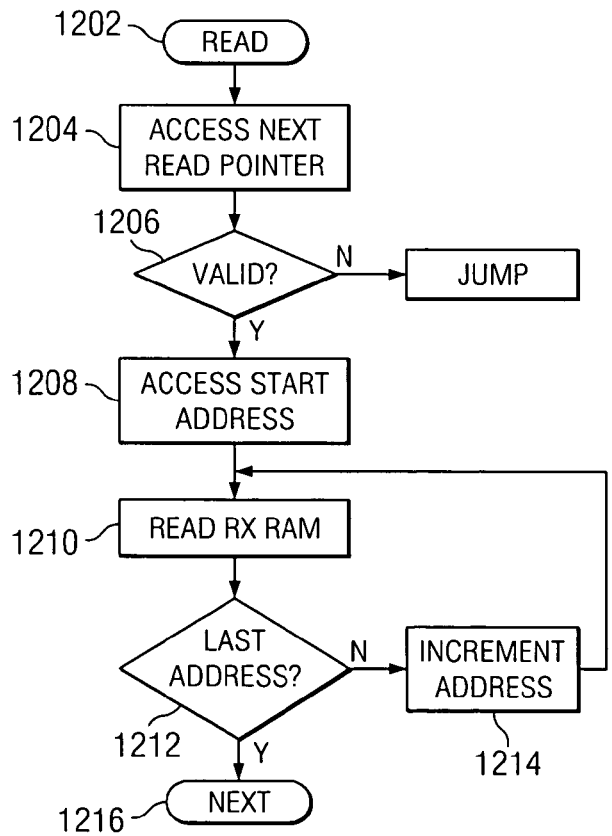
FIG. 12 illustrates a flow chart depicting the Read operation.

Referring now to FIG. 12, there is illustrated a flow chart for the Read operation, which is initiated at a block 1202 and then proceeds to a function block 1204 to access the next Read pointer and then to a decision block 1206 to determine if the bit was valid. If so, the program flows to a function block 1208 to access the start address and then read the receive RAM 230, as indicated by a function block 1210. The program then flows to a decision block 1212 to determine if the last address has been read, since the length of the packet is known. If not, the program flows along the "N" path to a function block 1214 to increment this address and then back to the input of function block 1210. The program then flows to a function block 1216 to go to the next packet.

Since the microcontroller 116 can independently read the RAM, once knowing the start address and the length, the microcontroller 116 can actually read the bytes out of order. For some situations, such as in a TC/IP protocol, it may be necessary to reorder the packets. Rather than reorder the packets once transferred to the microcontroller 116, the packets can be reordered by extracting them in the correct order. With the use of a separate TLB 704, this is feasible.

Figure 13:
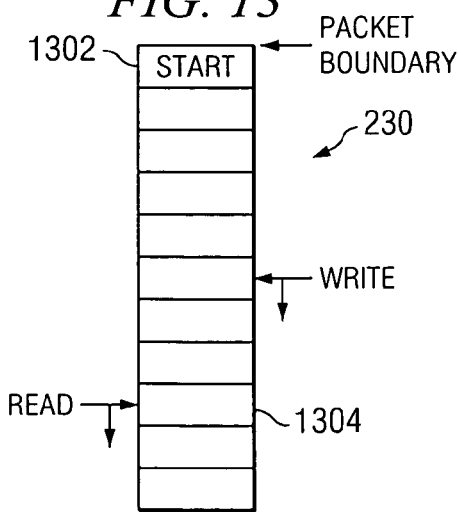
FIG. 13 illustrates a diagrammatic view of the read FIFO illustrating the Read and Write pointers associated therewith.

Referring now to FIG. 13, there is illustrated a diagrammatic view of the receiving RAM 230 and the manner in which writing and reading occurs. With use of the TLB 704, it is not necessary to read the end of the packets for writing thereto. Therefore, it can be seen that there is a start address for a given packet that is being read that was originally stored at a location 1302 in the RAM 230. However, the Read pointer is at a location 1304 in the memory, which is eight bytes into the packet. The Write pointer is operable to write over all of the storage locations that precede the location 1304, even though the packet being read is not complete, i.e., the start address in buffer location 1302 can be written over and is not required again, because this is the initial byte in the packet. The location 1302 represents the packet boundary of the packet being read, but not the packet boundary of the packet being written.

Although the preferred embodiment has been described in detail, it should be understood that various changes, substitutions and alterations can be made therein without departing from the spirit and scope of the invention as defined by the appended claims.

What is claimed is:

1. A single chip network controller for interfacing between a physical network and a processing system on a media side of the network controller external thereto, comprising:

a physical layer for receiving data for transmission to the network and encoding the received data for transmission thereto and for receiving data from the network, and for receiving data from the network and decoding the received data;

a media layer for interfacing with the external processing system for receiving data from the external processing system for interface with said physical layer for encoding and transmission thereof, and for receiving decoded data from said physical layer and providing access thereto by the external processing system;

on-chip non-volatile memory having a first portion associated with configuration information for configuring operation of said physical layer and said media layer and a second portion thereof that is accessible by the external processing system on the media side of the network controller; and a memory interface interfacing the external processing system with the second portion of said memory, the external processing system having an expanded memory capability, with the memory space of the external processing system being mapped with the memory space of the on-chip non-volatile memory, the mapped portion of the on-chip non-volatile memory extending the memory for the external processing system, wherein an address that is generated by the external processing system addresses a memory location in the internal memory space of the external processing system can be received by said memory interface to access a mapped location in said non-volatile memory.

2. The controller of claim 1, wherein said on-chip non-volatile memory comprises flash memory.

3. The controller of claim 1, wherein said non-volatile memory occupies a portion of an addressable memory space of the network controller and said memory interface allows address information to be received on an address input from the external processing system for selection of a defined addressable memory location in said non-volatile memory for reading of information therefrom and writing of information thereto by the external processing system.

4. The controller of claim 3, wherein said memory interface has a data input/output that is separate from said address input for reading and writing of data there through in a non-multiplexed operation.

5. The controller of claim 4, wherein said memory interface has Read/Write control inputs to control access to addressable locations in said non-volatile memory for a Read or a Write operation, wherein the external processing system accesses addressable memory locations in said non-volatile memory for a Read or a Write operation by generating both one or more memory access Read/Write control signals for input to said Read/Write control inputs and an address corresponding to a select one of the addressable locations in said non-volatile memory.

6. The controller of claim 3, wherein said address input of said memory interface operates as a data input/output for reading and writing of data there through in a multiplexed operation.

7. The controller of claim 3, and further comprising a controller memory for temporarily storing received data from said physical layer and processed by said media layer, and said controller memory occupying a portion of the address space of the controller independent of the portion thereof occupied by said non-volatile memory.

8. The memory interface of claim 1, wherein said non-volatile memory is accessible via Read/Write commands generated by the external processing system.

9. The controller of claim 1, wherein said media layer comprises a Media Access Controller (MAC).

10. A network appliance for interfacing between a physical network and providing a predefined functionality on the network, comprising:

a functional module having an associated functional module processing system for performing the predefined functionality; and a single chip network controller for interfacing between the physical network and said functional module and said associated processing on a media side of said network controller, said network controller including:

a physical layer for receiving data for transmission to the network and encoding the received data for transmission thereto and for receiving data from the network, and for receiving data from the physical network and decoding the received data, a media layer for interfacing with said functional module processing system for receiving data from said functional module processing system for interface with said physical layer for encoding and transmission thereof, and for receiving decoded data from said physical layer and providing access thereto by said functional module processing system, on-chip non-volatile memory having a first portion associated with configuration information for configuring operation of said physical layer and said media layer and a second portion thereof that is accessible by said functional module processing system on the media side of said network controller, and a memory interface for interfacing said functional module processing system with the second portion of said memory, such that said functional module processing system has an expanded memory capability, the memory space of said functional module processing system being mapped with the memory space of the on-chip non-volatile memory, the mapped portion of the on-chip non-volatile memory extending the memory for the functional module processing system, wherein an address generated by said functional module processing system that addresses a memory location in the internal memory space of the functional module processing system can be received by said memory interface to access a mapped location in said non-volatile memory.

11. The network appliance of claim 10, wherein said on-chip non-volatile memory comprises flash memory.

12. The network appliance of claim 10, wherein said non-volatile memory occupies a portion of an addressable memory space of the network controller and said memory interface allows address information to be received on an address input from the functional module processing system for selection of a defined addressable memory location in said non-volatile memory for reading of information therefrom and writing of information thereto by said functional module processing system.

13. The network appliance of claim 12, wherein said memory interface has a data input/output that is separate from said address input for reading and writing of data there through in a non-multiplexed operation.

14. The network appliance of claim 13, wherein said memory interface has Read/Write control inputs to control access to addressable locations in said non-volatile memory for a Read or a Write operation, wherein said functional module processing system accesses addressable memory locations in said non-volatile memory for a Read or a Write operation by generating both one or more memory access Read/Write control signals for input to said Read/Write control inputs and an address corresponding to a select one of the addressable locations in said non-volatile memory.

15. The network appliance of claim 12, wherein said address input of said memory interface operates as a data input/output for reading and writing of data there through in a multiplexed operation.

16. The network appliance of claim 12, and further comprising a controller memory for temporarily storing received data from said physical layer and processed by said media layer, and said controller memory occupying a portion of the address space of the controller independent of the portion thereof occupied by said non-volatile memory.

17. The memory interface of claim 10, wherein said non-volatile memory is accessible via Read/Write commands generated by said functional module processing system.

18. The network appliance of claim 10, wherein said media layer comprises a Media Access Controller (MAC).

* * * * *